United States Patent
Mashimo et al.

(10) Patent No.: US 9,302,917 B2
(45) Date of Patent: Apr. 5, 2016

(54) LOW VALENCE TITANIUM OXIDES AND METHOD OF PRODUCING THE SAME

(75) Inventors: Tsutomu Mashimo, Kumamoto (JP); Omurzak Uulu Emil, Kumamoto (JP); Naoto Kameyama, Kurashiki (JP); Makoto Okamoto, Kurashiki (JP); Yoshiaki Yasuda, Kurashiki (JP); Hideharu Iwasaki, Kurashiki (JP)

(73) Assignees: NATIONAL UNIVERSITY CORPORATION KUMAMOTO UNIVERSITY, Kumamoto-shi (JP); KURARAY CO., LTD., Kurashiki-shi (JP)

( * ) Notice: Subject to any disclaimer, the term of this patent is extended or adjusted under 35 U.S.C. 154(b) by 758 days.

(21) Appl. No.: 13/255,179

(22) PCT Filed: Mar. 11, 2010

(86) PCT No.: PCT/JP2010/054086
§ 371 (c)(1),
(2), (4) Date: Sep. 7, 2011

(87) PCT Pub. No.: WO2010/104141
PCT Pub. Date: Sep. 16, 2010

(65) Prior Publication Data
US 2012/0027668 A1   Feb. 2, 2012

(30) Foreign Application Priority Data

Mar. 12, 2009 (JP) .................................. 2009-059395
Sep. 15, 2009 (JP) .................................. 2009-212660

(51) Int. Cl.
*C01G 23/04* (2006.01)
*C25B 1/00* (2006.01)

(52) U.S. Cl.
CPC ............... *C01G 23/043* (2013.01); *C25B 1/00* (2013.01); *C01P 2002/72* (2013.01); *C01P 2002/82* (2013.01); *C01P 2002/88* (2013.01); *C01P 2006/40* (2013.01)

(58) Field of Classification Search
CPC .................................................... C01G 23/043
USPC ............ 423/608, 609, 610; 204/291; 205/538
See application file for complete search history.

(56) References Cited

U.S. PATENT DOCUMENTS

| 4,422,917 | A  | 12/1983 | Hayfield |
| 6,908,881 | B1 | 6/2005  | Sugihara |
| 2009/0042095 | A1 | 2/2009 | Inagaki et al. |

FOREIGN PATENT DOCUMENTS

| JP | 01 290529   | 11/1989 |
| JP | 03 236497   | 10/1991 |
| JP | 06 243951   | 9/1994  |
| JP | 2004 137087 | 5/2004  |
| JP | 2008 150240 | 7/2008  |
| JP | 2009 43679  | 2/2009  |
| WO | 00 10706    | 3/2000  |

OTHER PUBLICATIONS

International Search Report issued Apr. 20, 2010 in PCT/JP10/054086 filed Mar. 11, 2010.
"Low Valence Titanium Oxide," Titanium Oxide, pp. 272-273, (1991) (with English translation).
Bartholomew, R.F., "Electrical Properties of Some Titanium Oxides," Physical Review, vol. 187, No. 3, pp. 828-833, (1969).
Omurzak, E., et al., "Synthesis Method of Nanomaterials by Pulsed Plasma in Liquid," Journal of Nanoscience and Nanotechnology, vol. 7, No. 9, pp. 3157-3159, (2007).
Cha, W.-Y., et al., "Temperature Dependence of Ti Deoxidation Equilibria of Liquid Iron in Coexistence with 'Ti$_3$O$_5$' and Ti$_2$O$_3$," ISIJ International, vol. 48, No. 6, pp. 729-738, (2008).
Ioroi, T., et al., "Stability of Corrosion-Resistant Magneli-Phase Ti$_4$O$_7$-Supported PEMFC Catalysts at High Potentials," Journal of the Electrochemical Society, vol. 155, No. 4, pp. B321-B326, (Jan. 31, 2008).
Ioroi, T., et al., "Sub-stoichiometric titanium oxide-supported platinum electrocatalyst for polymer electrolyte fuel cells," Electrochemistry Communications, vol. 7, pp. 183-188, (2005).
Extended Search Report issued Jun. 30, 2014 in European Patent Application No. 10750894.7.

*Primary Examiner* — Matthew E Hoban
*Assistant Examiner* — James Fiorito
(74) *Attorney, Agent, or Firm* — Oblon, McClelland, Maier & Neustadt, L.L.P.

(57) ABSTRACT

The object of the present invention is to provide a method of producing low valence titanium oxides in a steady supply manner acceptable in industrial production. The low valence titanium oxides are produced by electrical discharge between two electrodes in an aqueous medium, wherein at least one of the electrodes is a titanium-containing electrode.

19 Claims, 13 Drawing Sheets

LOW VALENCE TITANIUM OXIDES AND METHOD OF PRODUCING THE SAME

TECHNICAL FIELD

The present invention relates to low valence titanium oxides suitable for use as a photocatalyst useful as an environmental purification material to remove harmful substances and to decompose malodorous substances, or as an antifouling coating or a sterilization agent, and a conductive material such as a thin-film electrode and an antistatic agent.

BACKGROUND ART

Titanium oxides have been used as a white pigment having excellent hiding power and weather resistance for a long time. Recently, photocatalyst properties of titanium oxides are attracting attention. The photocatalyst generates radicals such as hydroxyl radicals and super oxide anion when UV is irradiated on the surface of the photocatalyst. The radicals adsorb or oxidatively decompose harmful substances (e.g. aldehydes), to decompose malodorous substances (substances regulated by the Offensive Odor Control Act), to prevent fouling or to sterilize. Recently, advances are made in applying photocatalysts as coatings to make use of the above functions. Many metal oxides are available as photocatalysts. Among them, anatase titanium oxides having high activity are used widely.

Meanwhile, low valence titanium oxides ($TiO_x$; $0<x<2$) such as $Ti_2O_3$ and the like are studied as inorganic black pigments being capable of replacing carbon black which is suspected to be a carcinogen (refer to Patent Document 1), as antistatic agent using their electrical conductivity and applied to materials such as paints, plastics, fibers and papers (refer to Non-patent Document 1), as oxygen absorbents (refer to Patent Document 2), as electrode materials of secondary cells (refer to Patent Document 3), and as materials that can expand the above-mentioned photocatalyst properties to the visible light range (refer to Patent Document 4).

Each of the above-mentioned properties exhibits a specific range of oxidation numbers corresponding to the usage of that property. For example, a composition with oxidation number, $0.2<x<1.95$ is suitable as black pigment; a composition with oxidation number, $x=1.75$ exhibits a maximum electrical conductivity (refer to Non-patent Document 2); a composition with oxidation number, $1.5<x<1.9$ is suitable as an oxygen absorbent; a composition with oxidation number, $x=1$, $1.67$, $1.85<x<2$ is suitable as an electrode material of a secondary cell; and a composition with oxidation number, $1.5<x<1.95$ is suitable as a catalyst responsive to visible light.

The known methods of producing the low valence titanium oxides include a method of sintering metallic titanium and titanium dioxides under the present of nitrogen and a method of sintering titanium dioxides as the starting material in non-oxidizing or reducing atmosphere. In addition, a method of producing titanium monoxide using a pulsed plasma is disclosed (refer to Non-patent Document 3). Further, a method of producing low valence titanium oxides by reducing titanium dioxide at a temperature over 1000° C. in a hydrogen atmosphere is known (Non-patent Documents 4 to 6).

The method of producing low valence titanium oxides by reducing titanium dioxide can control the oxidation number to a certain extent by setting the reaction time or by other measures. However, the progress of the reduction process takes time to reach the interior of the particles, and further, processing at a high temperature generates sintered bodies and makes it difficult to obtain nano-particulates. Another problem in the reduction process is the use of explosive substances such as hydrogen at high temperatures.

Although an example exists of using titanium in electrodes for electrical discharging machining in view of its high melting point and high strength, oxide generation is difficult under the condition used in electrical discharging machining. In view of the background art, titanium-containing electrodes are almost never placed in water under conditions used in electrical discharging machining to produce titanium oxides. In fact, there is a report relating to methods for obtaining titanium monoxide particulates by the pulsed plasma method as shown in Non-patent Document 3, but no disclosures exist in relation to oxidation number control in titanium oxides generation.

Applications of titanium oxides as photocatalysts and electrical conductive materials are largely affected by the control of crystal morphology and the control of particle size distribution in addition to the control of oxidation numbers. The conventional methods of producing low valence titanium oxides mentioned above involve difficulties to inhibit any easy and stable production of an industrially acceptable level of low valence titanium oxides having a desired composition in addition to a uniform particle size distribution in the nano-order, and improvement was called for.

CITATION LIST

Patent Documents

Patent Document 1: Japanese patent publication No. 2008-150240 A

Patent Document 2: Japanese patent publication No. 2004-137087 A

Patent Document 3: Japanese patent publication No. 2009-043679 A

Patent Document 4: International publication WO 2000/010706 A1

Non-Patent Documents

Non-patent Document 1: "Sanka Chitan", p. 272-273, June 1991, Gihoudou Shuppan

Non-patent Document 2: Physical Review, Vol. 187, p. 828-833 (1969)

Non-patent Document 3: J. of Nanoscience and Nanotechnology Vol. 7, p. 3157-3159, 2007

Non-patent Document 4: ISIJ International, Vol. 48 (2008), No. 6, pp. 729-738

Non-patent Document 5: J. Electrochem. Soc., Vol. 155, No. 4, p. B321-B326 (2008)

Non-patent Document 6: Electrochem. Communi., Vol. 7 (2005), p. 183-188

SUMMARY OF INVENTION

Technical Problem

It is an object of the present invention in view of the above problems in the conventional art to provide a method for stably producing an industrial level of low valence titanium oxide particulates with desired compositions, and in particular, to provide a method of producing low valence titanium oxides having any suitable composition in steady supply manner acceptable in industrial production, in particular, a method of producing low valance titanium oxide fine particulates having valence numbers exhibiting electrical conductivity and containing no electrical conductive compounds of elements such as iron and nickel or corrosive substances such as chlorine and sulfate group in steady supply manner acceptable in an industrial production.

Solution to Problem

The inventors of the present invention have continued dedicated studies to achieve the above object and have found that low valence titanium oxides can be obtained by an electrical discharge between two electrodes in an aqueous medium, wherein the electrodes include at least one titanium oxide-containing electrode; and thereby obtained the present invention.

The present invention also provides the following:

[1] A method of producing low valence titanium oxides comprising electrical discharging between two electrodes in an aqueous medium to produce low valence titanium oxides, wherein at least one of the electrodes is a titanium-containing electrode;

[2] The method according to [1] wherein direct-current discharging is used;

[3] The method according to [2] wherein direct-current continuous discharging is used;

[4] The method according to [2] wherein direct-current pulsed discharging is used;

[5] Low valence titanium oxides represented by $TiO_x$ ($0.15<x<2.0$) which is produced by the method according to any one of [2] to [4];

[6] The method according to [1] comprising a step of generating an electrical discharge between two electrodes to prepare the low valence titanium oxide, wherein at least one of the electrodes is a titanium oxide-containing electrode;

[7] The method according to [6] by electrical discharging between a titanium oxide-containing electrode and a metal titanium electrode to produce the low valence titanium oxides;

[8] The method according to [6] by electrical discharging between two titanium oxide-containing electrodes to produce the low valence titanium oxides;

[9] The method according to any one of [6] to [8] wherein direct-current continuous discharging is used;

[10] The method according to any one of [6] to [8] wherein pulsed discharging is used;

[11] The method according to any one of [6] to [10] wherein the titanium oxide-containing electrode comprises a conductive titanium oxide;

[12] The method according to any one of [6] to [10] wherein the titanium oxide-containing electrode comprises metal titanium and nonconductive titanium oxides;

[13] Low valence titanium oxides represented by $TiO_x$ ($1.5<x<2.0$) which is produced by the method according to any one of [6] to [12];

[14] An electrode comprising conductive titanium oxides;

[15] The electrode according to [14] wherein the electrode is used for preparing low valence titanium oxides.

Advantageous Effect of Invention

The method of the present invention can produce low valence titanium oxide particulates having a desired composition in a steady supply manner acceptable in industrial production.

According to one aspect of the present invention, low valence titanium oxides having a desired composition can be produced by direct-current electrical discharging between two electrodes wherein at least one electrode is a titanium-containing electrode.

According to another aspect of the present invention, low valence titanium oxides can be produced by electrical discharging between two electrodes wherein at least one of the electrodes is a titanium oxide-containing electrode. In this aspect, reduction reaction will be caused on one electrode (a reduction electrode) and oxidation reaction will be caused on the other (an oxidation electrode) so that the generation speed of the objective low valence titanium oxides will be higher. In the case that one electrode is the metal titanium-containing electrode, the metal titanium-containing electrode becomes the reduction electrode and the other electrode becomes the oxidation electrode by pulsed discharging or direct-current discharging so that the reaction speed in water is extremely slow and thus, the reaction speed is low. The present method using the titanium oxides-containing electrode solves the problem of lowering generation speed by making the reduction reaction take place in a titanium oxide-containing electrode since the reduction reaction is caused on the titanium oxide-containing electrode, namely the titanium oxides are reduced to low valence oxidation state. Further, the present invention is advantageous in that it requires no special device or facility for preventing danger, because the present invention accelerates reactions by generating an electrical discharge having a high electrical current and a comparatively low voltage in water. Further, the present invention is advantageous in that it requires no reactor of a special material because the reaction is not induced in a reductive atmosphere.

Further, the low valence titanium oxide obtained by the present invention has excellent electric conductivity, and advances are expected in its usage as various electronic devices and photocatalysts. In particular, expectations exist for its use as an electrode material of secondary cells.

DESCRIPTION OF EMBODIMENTS

Figure 1:
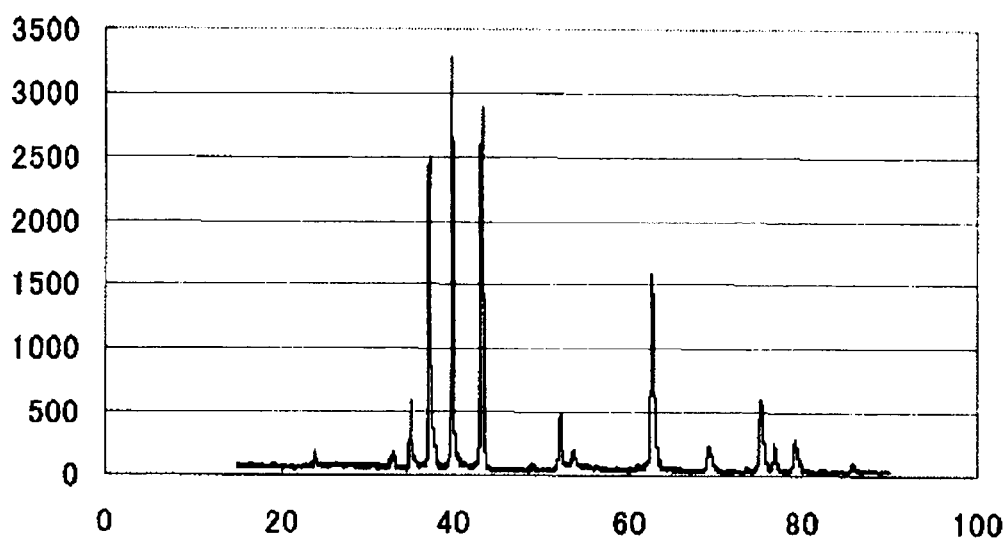
FIG. 1 is an X-ray diffraction spectrum of Sample 1-1.

The method of producing low valence titanium oxides according to the present invention comprises electrical discharging between two electrodes in an aqueous medium to produce the low valence titanium oxides, wherein at least one of the electrodes is a titanium oxide-containing electrode. The generation mechanism of low valence titanium oxides by electrical discharging is presumed as described below. A voltage beyond the dielectric breakdown voltage is applied between opposing electrodes in an aqueous medium to generate an electrical discharge; plasma which is generated during the discharge melts the titanium oxide-containing electrodes, and the titanium oxide from the titanium oxide-containing electrodes diffuses into the aqueous medium; when the titanium oxides react with water, it is immediately quenched to form particulates.

The two electrodes necessary have sufficient electrical conductivity for inducing electrical discharge between the electrodes. The required electrical conductivity varies according to the shape of the electrodes, the electrical conductance of the medium, and the voltage between electrodes allowed by the device, but a suitable volume conductivity is at least $10^{-7}$ [S/cm] or higher, and for the most part, preferably $10^{-5}$ [S/cm] or higher.

The use of two metal titanium electrodes as the two electrodes can provide low valence titanium oxides. It is also possible to form mixed oxides by using a titanium based alloy containing other metals, or by using one electrode of metal titanium and another of a different type. If a titanium-containing electrode is used for at least one electrode, the material of the other electrode will not be specifically limited as long as it maintains its original shape at room temperature and it discharges electricity, and usable substances include metals such as silicon, tin, aluminum, indium, antimony, bismuth; transition metals such as cobalt, iron, copper, silver, manganese, nickel, zinc, zirconium, tungsten; and graphite.

In one aspect of the present invention, a titanium oxide-containing electrode is used as at least one of the electrodes. Methods for providing electrical conductivity to the titanium oxide-containing electrode are not specifically limited, and (1) a method of composing an electrode from a conductive titanium oxide, and (2) a method of using an electrode comprising metal titanium and a titanium oxide can be used, wherein the purity varies according to the usage.

When a conductive titanium oxide is used as an electrode, a mould body composed solely of the conductive titanium oxide may be used. The electrode containing a conductive titanium oxide may further contain nonconductive titanium oxides.

In the case of using an electrode comprising metal titanium and titanium oxides, the titanium oxides may be conductive or nonconductive. The electrode can be in a sintered form of the mixture or in a form of a metal titanium body covered with a titanium oxide film.

To ensure the electrical conductivity of the electrode, the ratio of electrical conductive components such as the electrical conductive titanium oxide or metal titanium is preferably 10 or higher by weight to a nonconductive titanium oxide of 1.

Examples of methods for producing the conductive titanium oxides electrode and the electrode comprising metal titanium and the conductive titanium oxides include methods of moulding titanium oxide while introducing oxygen defect by processes using high heat such as plasma spraying, arc spraying, high-speed flame spraying, or methods of integrally moulding the conductive titanium oxides by processes such as sintering and pressing in an atmosphere of inert gas such as nitrogen.

The methods of producing the electrode comprising metal titanium and nonconductive titanium oxides include a method of mixing the particles of both the metal titanium and the nonconductive titanium oxides and integrally moulding the mixture by processes such as pressing and sintering.

The low valence titanium oxides may be obtained by using the above titanium oxide-containing electrode, or by using the above titanium oxide-containing electrode and the metal titanium electrode.

The electrodes may be of any shape including a bar shape, a wire shape, a plate shape. Concerning the size of the two electrodes, the electrodes may be of different sizes.

According to the present invention, the low valence titanium oxides are generated in an aqueous medium. The aqueous medium used in the present invention is preferably composed of, although not limited to, water at a ratio of 50 wt % or higher to the medium, and it is either water or a mixture of water and a water soluble organic solvent. Examples of water soluble organic solvents include alkylene glycol such as ethylene glycol, 1,2-propylene glycol, 1,3-propylene glycol, 1,2-butanediol, 1,4-butanediol; oxyalkylene glycol such as diethylene glycol, tetraethylene glycol, polyethylene glycol; and methyl ethers and ethyl ethers thereof. Ion-exchanged water may be used simply to obtain low valence titanium oxides, and the oxidation number can be controlled by adding hydrogen peroxide and by controlling temperature.

No specific limitation is placed on the amount of an aqueous medium to be used as long as there is enough to completely cover the surfaces of the two electrodes which are subjected to discharge and are the electrode parts closest to the other electrode, and to provide heat diffusion for eliminating plasma.

The electric current to be applied between the two electrodes for electrical discharge generation can be either a direct current or an alternating current, and the alternating current can be rectified by using a diode.

According to the present invention, the low valence titanium oxides are generated by discharging electricity between two electrodes in an aqueous medium. The discharge voltage is not specifically limited, and it is normally in the range of 20 to 500 V, preferably in the range of 60 to 400 V, and more preferably in the range of 80 to 300V. This is because the discharge voltage within the above range does not require a special device in view of safety.

The discharge current is not specifically limited, and the range of 1 to 200 A is typically used. The discharge electric current is preferably in the range of 2 to 150 A, and more preferably in the range of 5 to 120 A in view of the production yield and the energy efficiency.

The electrical discharge can be continuous (continuous discharge) or pulsed (pulsed discharge). Since the environment of the generated plasma varies according to the discharge method, the oxidation number distribution, the particle size distribution, and the crystal morphology of the obtained low valence titanium oxides also vary.

The pulse interval for the pulsed discharge is not specifically limited, but it is preferably 0.01 microseconds to 100 milliseconds, and more preferably 0.1 microseconds to 50 milliseconds. When the interval is too short, the time period to eliminate plasma generated by the previous discharging will be insufficient and the oxidation number distribution, the particle size distribution of the product per discharge will be uneven. On the other hand, an excessively long interval significantly lowers the amount of generated products, so such interval is economically undesirable.

Although the duration per discharge in the pulsed discharge differs according to the applied voltage and current, it is normally 1 to 500 microseconds, and preferably 5 to 300 microseconds in view of the efficiency of discharge. When the duration per discharge is too long, the product selectivity specific to the pulsed discharge decreases. On the other hand, the duration per discharge is too short, sufficient supply of energy is not accomplished so that the generation efficiency of low valence titanium oxides will be lowered.

The pattern of the pulsed voltage to be applied is not specifically limited, and a sine wave, a square wave, or a triangular wave may be used. Application of the square wave is preferable in view of its efficiency in relation to the discharge energy.

The temperature of the aqueous medium for generating electrical discharge is not specifically limited, but it depends on the type and quantity of the aqueous medium, and it is normally in the range of room temperature to 100° C. Excessively high temperatures may be undesirable, because the vapor pressure of the aqueous medium that is used will increase and the length of time of a continuous discharge will be shortened. Excessively low temperatures may be undesirable, not only because the viscosity of the aqueous medium will increase to lower the reactivity, but also because the diffusion of the generated products will be impaired.

Electrodes can be vibrated in the present invention. This is preferable not only because applying vibration prevents the retention of generated products deposited between the electrodes and reduces or eliminates reaction products attached to the retained products, but also because it improves the efficiency of electrical discharge. The method for applying vibration is not specifically limited, and it can be a method of applying vibration regularly as well as that of applying vibration intermittently.

The atmosphere for conducting the present invention is not specifically limited, and the present invention can be conducted under the reduced pressure, the increased pressure, or the normal pressure. It is normally conducted in an atmosphere of inert gas such as nitrogen and argon in view of safety and handleability.

The generated low valence titanium oxides accumulates in the liquid, so the low valence titanium oxides of the present invention can be obtained as particulates by common methods including processes such as filtering, centrifuge, rinsing, and drying.

The oxidation number of low valence titanium oxides can be adjusted to any number between $TiO_x$ ($0.15<x<2.0$, specifically, $1.5<x<2.0$) by any suitable adjusting of the titanium oxide-containing electrode, the temperature of the aqueous medium, additives such as hydrogen peroxide, and the manner for applying electric current as necessary in the above procedure. Further, by maintaining these conditions at a constant level throughout the reaction from beginning to end, the particle size distribution and the crystal morphology can be made uniform.

Further, the structure of the low valence titanium oxides of the present invention can be thermally modified. The low valence titanium oxides may be produced in a thermally unstable structure because its reaction time is extremely short, and it is quenched rapidly. Thus, such low valence titanium oxides may be sintered in an atmosphere of inert gas (in a non-oxidizing atmosphere) to the extent that the oxidation number remains unchanged and the particles are kept from being enlarged by agglomeration.

The temperature of sintering is normally in the range of 200 to 1800° C., and preferably in the range of 300 to 1000° C. to provide thermal stability.

The duration of sintering is not specifically limited, and any duration that is sufficient for the structure to change is acceptable; normally, the duration is in the range of 10 minutes to 24 hours, and preferably in the range of 30 minutes to 12 hours in view of the effects and the economic efficiency.

Subsequent to the sintering, the low valence titanium oxides may be cooled to a temperature that does not induce oxidization, which is normally 200° C. or lower, in a non-oxidizing atmosphere.

EXAMPLE

The following non-limiting examples describe the present invention in detail.

The physical properties shown in the Examples were measured by the following methods.

(Determining the Composition)

The composition was determined based on the weight increase of a sufficiently dry sample using a thermogravimetric analyzer (TGA) wherein the dry sample was heated to a temperature of 1000° C. at a rate of temperature increase of 5° C./min.

Example 1-1

Ion-exchanged water (200 g) was charged into a 300 ml beaker and maintained at 30° C. in a bath. Two metal titanium electrodes (purity of 99% or higher) were inserted into the ion-exchanged water, wherein each electrode had a diameter of 5 mm and a length of 100 mm and a diagonally cut end (at about 45°). The respective surfaces of the diagonally cut ends were positioned 0.5 mm apart and opposing each other, and vibration was applied to the electrodes to reduce or eliminate the accumulation of the reaction products on their surfaces and to improve reaction efficiency. The respective electrodes were connected to a DC power source and a square wave pulsed DC voltage of 200 V, 8 A was applied in accordance with the vibration of the electrodes, and electrical discharge was repeated with a discharge interval of 20 milliseconds and a discharge duration of 200 microseconds.

Generation of solid particulates was observed when electrical discharging started. As the electrodes were consuming, they were shifted. After five hours of electrical discharge, the generated solid particulates were separated by centrifugation. Then, the particulates were rinsed with 200 ml of ion-exchanged water and subsequently dried with hot air of 110° C. to obtain 11.3 g of particulates with a black appearance (Sample 1-1).

The composition of Sample 1-1 was estimated by TGA. Weight change due to oxidation was saturated at around 900° C.; the weight increment was 35.6% compared with the weight at room temperature. The sample after oxidation had a white appearance and it was identified as $TiO_2$ by an X-ray structural analysis. Based on these results, the average composition of Sample 1-1 was estimated to be $TiO_x$ ($x=0.689$).

The X-ray diffraction spectrum of Sample 1-1 is shown in FIG. 1 (the vertical axis is intensity, the horizontal axis is 2θ).

Figure 2:
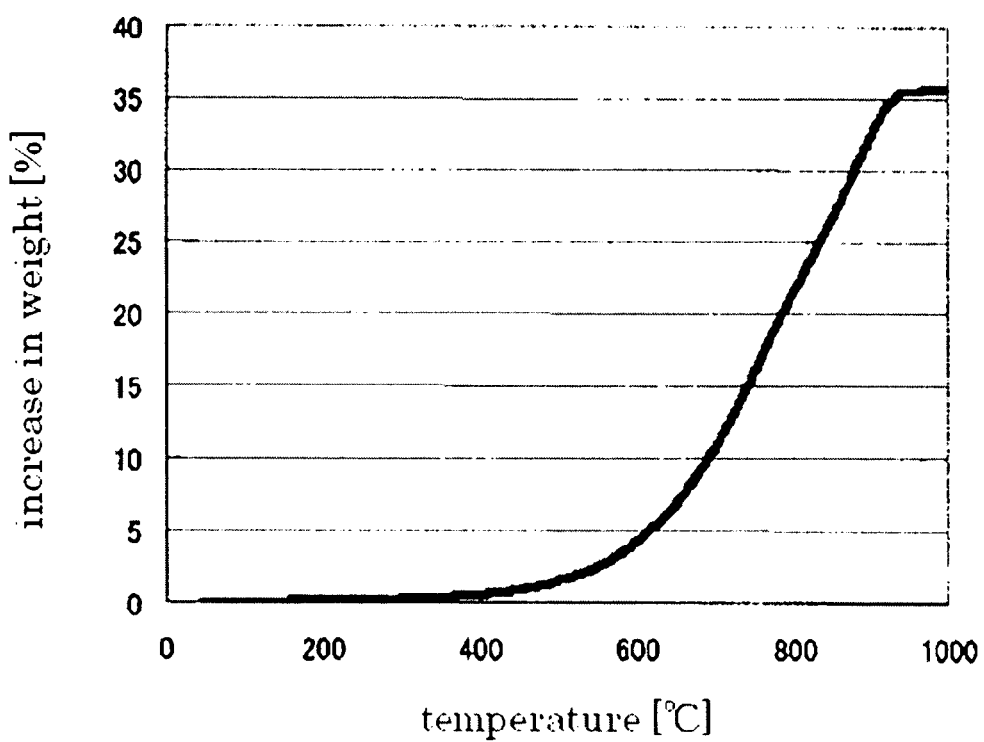
FIG. 2 is a thermogravimetric analysis diagram of Sample 1-1.

The thermogravimetric analysis diagram of Sample 1-1 is shown in FIG. 2.

Example 1-2

The procedure of Example 1-1 was performed except that the temperature of the ion-exchanged water in Example 1-1 was changed to 90° C., to obtain 9.0 g of particulates with a black appearance (Sample 1-2). As a result of the gravimetric analysis, Sample 1-2 was estimated to have x=1.713.

Figure 3:
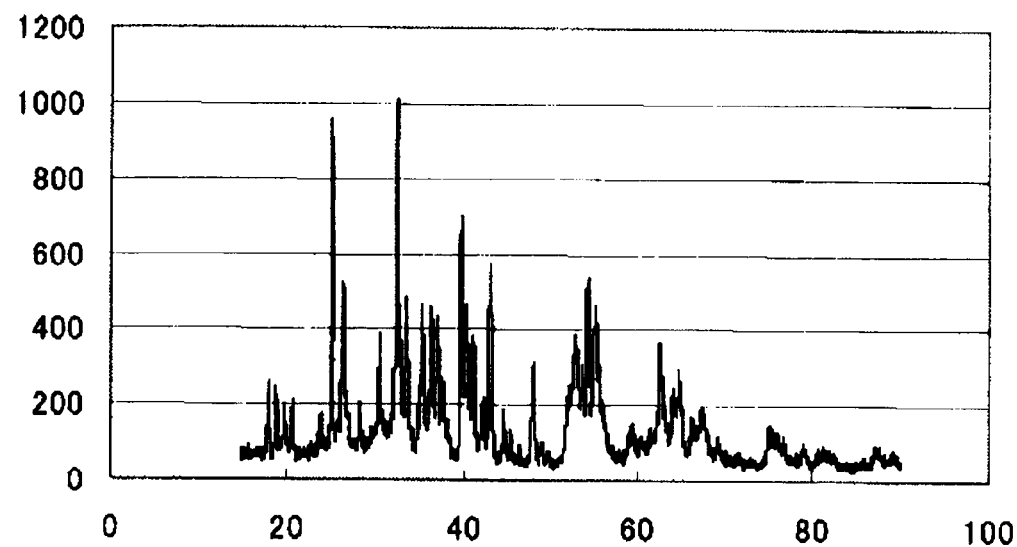
FIG. 3 is an X-ray diffraction spectrum of Sample 1-2.

The X-ray diffraction spectrum of Sample 1-2 is shown in FIG. 3 (the vertical axis is intensity, the horizontal axis is 2θ).

Figure 4:
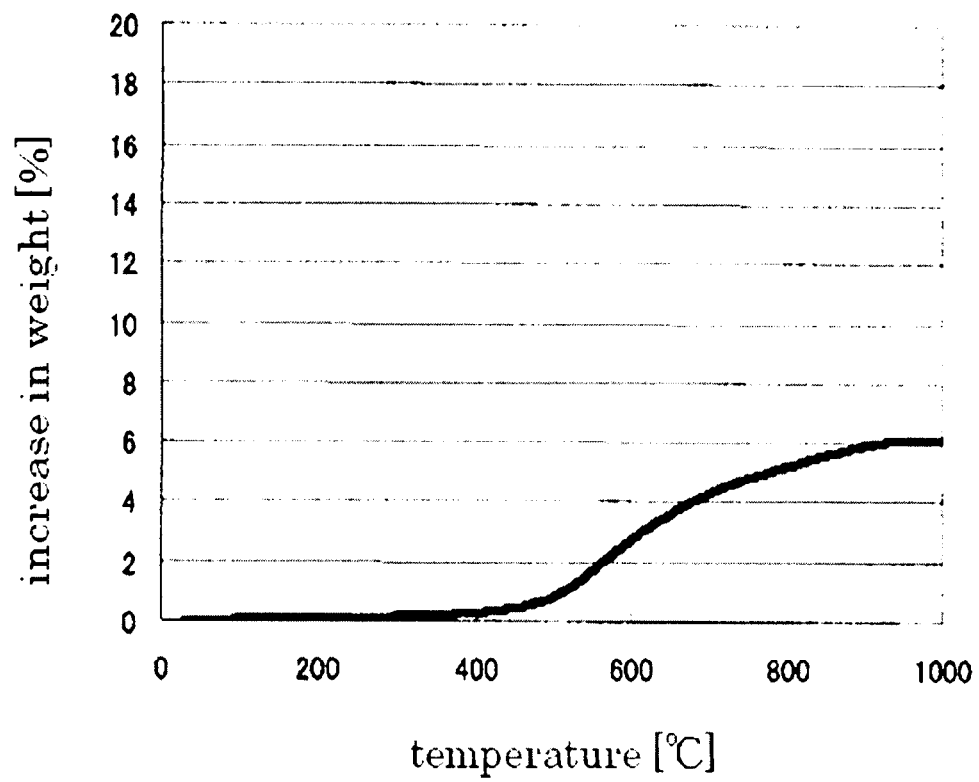
FIG. 4 is a thermogravimetric analysis diagram of Sample 1-2.

The thermogravimetric analysis diagram of Sample 1-2 is shown in FIG. 4.

Example 1-3

Ion-exchanged water (200 g) was charged into a 300 ml beaker, and maintained at 30° C. in a bath. Two metal titanium electrodes (purity of 99% or higher) were inserted into the ion-exchanged water, wherein each electrode had a diameter of 5 mm and a length of 100 mm and a diagonally cut end (at about 45°). The respective surfaces of the diagonally cut ends were positioned 0.5 mm apart and opposing each other. The respective electrodes were connected to a DC power source, and the electrodes with 200 V of voltage applied thereto were gradually brought close to discharge electricity. As the electrodes were consuming, they were shifted to maintain the continuous discharge state. The direct current during a stable electrical discharge was 3 A.

Generation of solid particulates was observed when electrical discharging started. After two hours of electrical discharge, the generated solid particulates were separated. Then, the particulates were rinsed with 200 ml of ion-exchanged water and subsequently dried with hot air of 110° C. to obtain 15.1 g of powders with a blue appearance (Sample 1-3). As a result of the thermogravimetric analysis, Sample 1-3 was estimated to have x=1.961.

Figure 5:
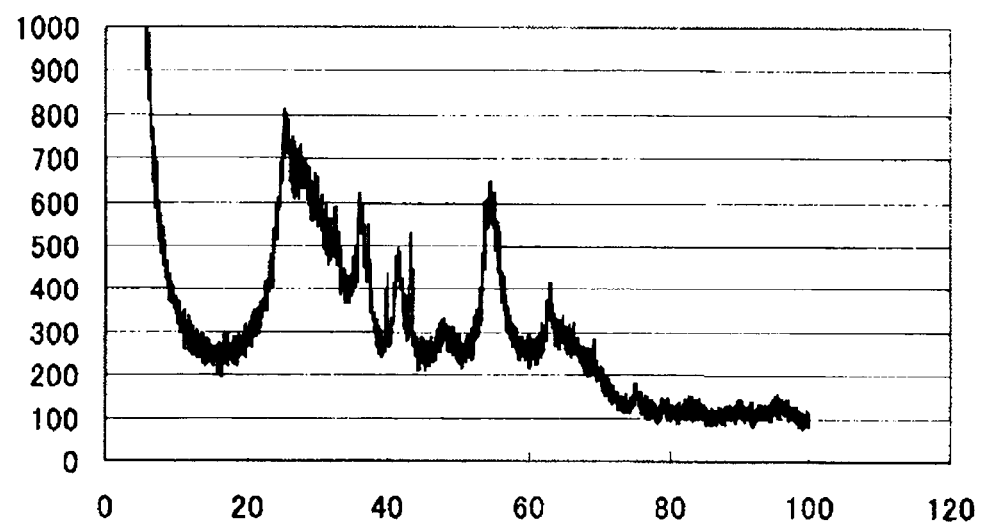
FIG. 5 is an X-ray diffraction spectrum of Sample 1-3.

The X-ray diffraction spectrum of Sample 1-3 is shown in FIG. 5 (the vertical axis is intensity, the horizontal axis is 2θ).

Figure 6:
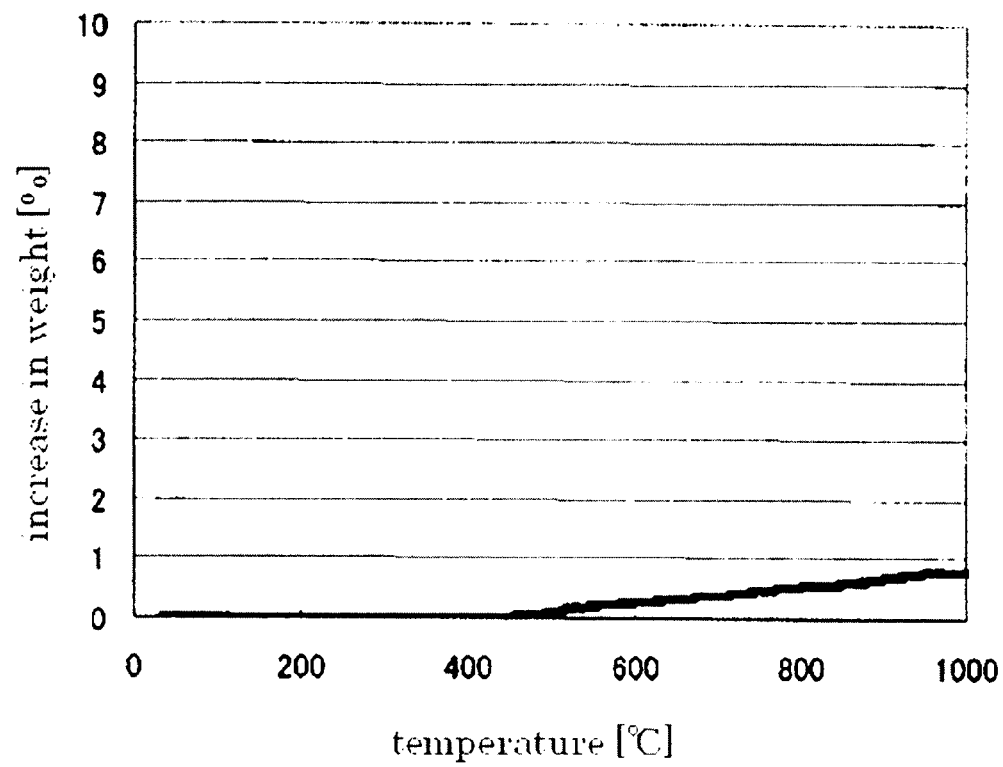
FIG. 6 is a thermogravimetric analysis diagram of Sample 1-3.

The thermogravimetric analysis diagram of Sample 1-3 is shown in FIG. 6.

Example 1-4

The procedure of Example 1-1 was performed except that the output current of Example 1-1 was changed to 20 A.

Generation of solid particulates was observed when electrical discharging started. After five hours of electrical discharge, the generated solid particulates were separated by centrifugation. Then, the particulates were rinsed with 200 ml of ion-exchanged water and dried with hot air of 110° C. to obtain 18.6 g of powders with a black appearance (Sample 1-4).

When this sample was oxidized to form $TiO_2$ similarly to Example 1-1, the increase in weight was 35.4%, so the average composition of Sample 1-4 was estimated to be $TiO_x$ (x=0.694).

Example 1-5

The procedure of Example 1-1 was performed except that the output current of Example 1-1 was changed to 60 A.

Generation of solid particulates was observed when electrical discharging started. After five hours of electrical discharge, the generated solid particulates were separated by centrifugation. Then, the particulates were rinsed with 200 ml of ion-exchanged water and dried with hot air of 110° C. to obtain 27.0 g of particulates having a black appearance (Sample 5).

When this sample was oxidized to form $TiO_2$ similarly to Example 1-1, the increase in weight was 35.7%, so the average composition of Sample 1-5 was estimated to be $TiO_x$ (x=0.686).

Example 2-1

Ion-exchanged water (200 g) was weighed into a 300 ml beaker, and maintained at 30° C. in a bath. Two titanium oxides-containing electrodes were inserted into the ion-exchanged water and positioned 0.1 mm apart with their sides crossing orthogonally, wherein each electrode was composed of a square bar of metal titanium which has a cross-section with two 5 mm edges and a length of 200 mm and whose longitudinal sides are covered with a conductive titanium oxide coating that is 0.5 mm thick. The titanium oxide-containing electrodes were prepared by using a plasma spraying pistol for argon and hydrogen having an output power of 45 kw (produced by Meteyu Co.) and by depositing common titanium dioxide powders (Company name: Sakai Chemical Industry Co., Product name: FTR700, primary particle size 200 nm) granulated to an average particle size of 44 micron on square bars of metal titanium to form a thickness of 0.5 mm. Deposition was performed by providing the titanium dioxide powders to 10 L/min of argon and 1 L/min of hydrogen. The deposition lasted three minutes. The result of the XRD showed that the titanium oxides of the coating contains tetravalent titanium oxide ($TiO_2$) as the main component, and exhibits electrical conductivity due to small oxygen defects. The respective electrodes were connected to a rectified alternating-current power supply and a square wave pulsed voltage of 200 V, 8 A was applied between the electrodes to repeat the electrical discharge at the discharge interval of 20 milliseconds and the discharge duration of 200 microseconds. The electrical discharge was generated only on the respective surfaces facing the other electrode, and the conductive titanium oxide coatings of the discharging sections were consuming. The electrodes were slid in the respective longitudinal directions with control to prevent exposure of the inner titanium square bars brought about by the consumption of the conductive titanium oxides coatings; and hence, the electrical discharge was generated between the conductive titanium oxide coatings. The electrodes were slid at a velocity of 5 mm/min.

Generation of solid particulates was observed in water when electrical discharging started. As the conductive titanium oxide coatings on the electrodes consumed, the electrodes were shifted. After thirty minutes of electrical discharge, the generated solid particulates were separated by centrifugation. Then, the particulates were rinsed with 200 ml of ion-exchanged water and subsequently dried with hot air of 110° C. to obtain 3.1 g of particulates with a black appearance (Sample 2-1).

The composition of Sample 2-1 was estimated by the gravimetric analysis. Weight change due to oxidation was saturated at around 900° C.; the resulting weight increment was 5.54% compared with that at room temperature. The sample after oxidation had a white appearance and it was identified as $TiO_2$ by an X-ray structural analysis. Based on these results, the average composition of Sample 2-1 was estimated to be $TiO_x$ (x=1.738). When the composition of the conductive titanium oxide coatings before the discharge was similarly estimated, the result was $TiO_x$ (x=1.844).

Figure 7:
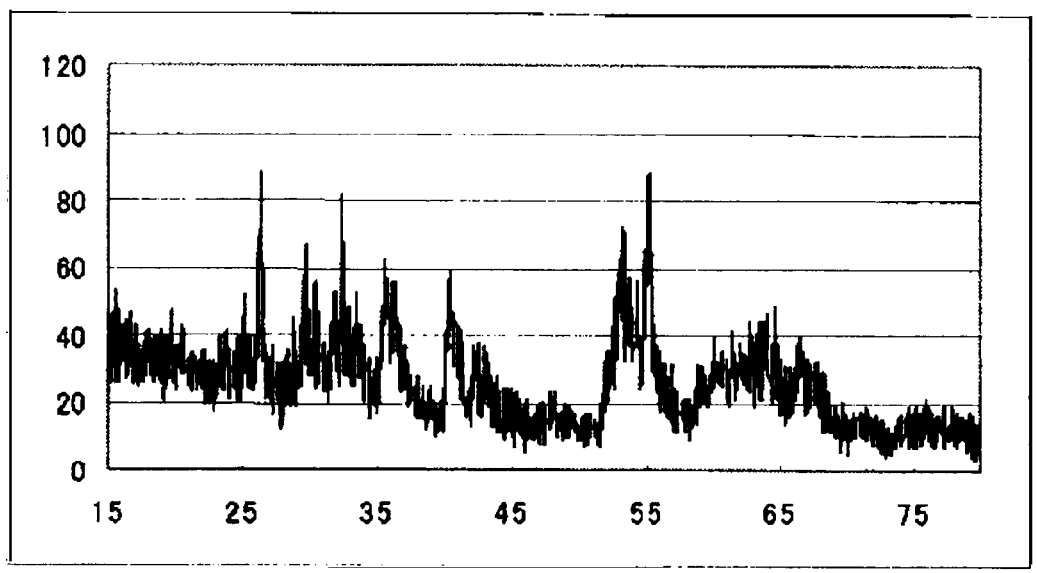
FIG. 7 is an X-ray diffraction spectrum of Sample 2-1.

The X-ray diffraction spectrum of Sample 2-1 is shown in FIG. 7 (the vertical axis is intensity, the horizontal axis is 2θ).

Figure 8:
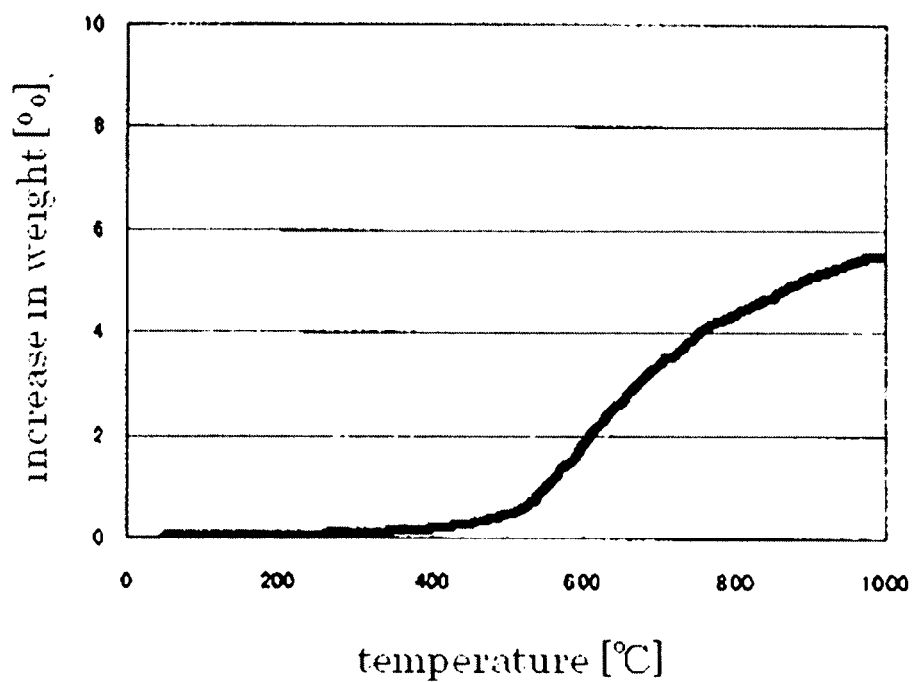
FIG. 8 is a thermogravimetric analysis diagram of Sample 2-1.

The thermogravimetric analysis diagram of Sample 2-1 is shown in FIG. 8.

Example 2-2

The procedure of Example 2-1 was performed, except that one of the electrodes of Example 2-1 was changed to a square bar having a cross section with two 5 mm edges and a length of 200 mm and no titanium oxide coating, to obtain 1.7 g of particulates with a black appearance (Sample 2-2). As a result of the gravimetric analysis, Sample 2-2 was estimated to have x=1.766.

Figure 9:
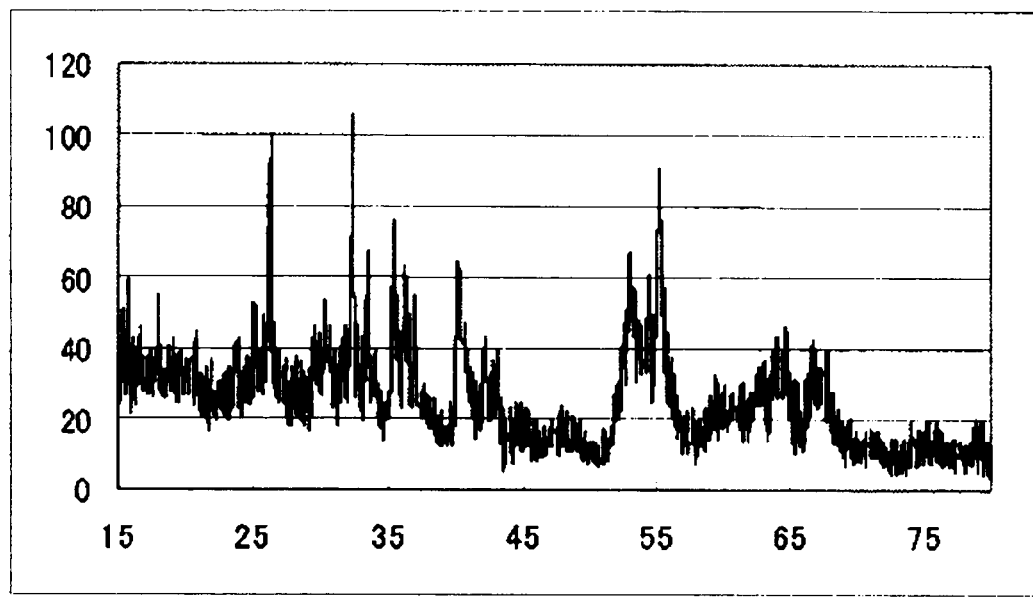
FIG. 9 is an X-ray diffraction spectrum of Sample 2-2.

The X-ray diffraction spectrum of Sample 2-2 is shown in FIG. 9 (the vertical axis is intensity, the horizontal axis is 2θ).

Figure 10:
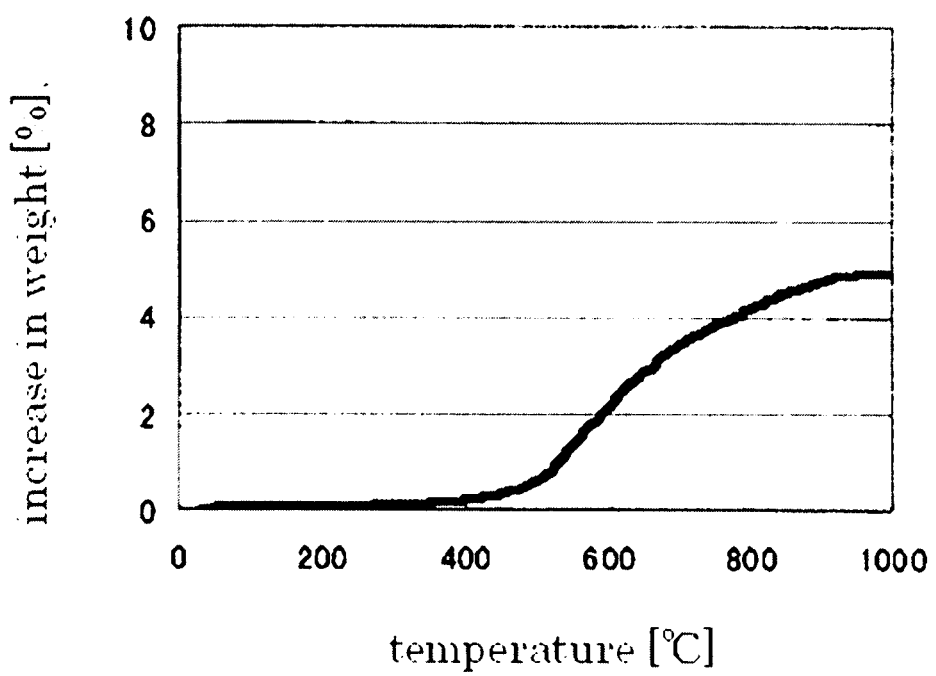
FIG. 10 is a thermogravimetric analysis diagram of Sample 2-2.

The thermogravimetric analysis diagram of Sample 2-2 is shown in FIG. 10.

Example 2-3

The procedure of Example 2-1 was performed except that the two titanium oxide-containing electrodes of Example 2-1 were changed to those composed of square bars of metal titanium wherein each bar has a cross-section with two 5 mm edges and a length of 200 mm and whose longitudinal sides are covered with nonconductive titanium oxide coating that is 0.01 mm thick, to obtain 0.03 g of particulates with a blue appearance (Sample 2-3). The titanium oxide-containing electrodes were prepared by using a plasma spraying pistol for argon and hydrogen having an output power of 45 kw (produced by Meteyu Co.) and by depositing common titanium dioxide powders (Company name: Sakai Chemical Industry Co., Product name: STA-100A, primary particle size 10 nm) granulated to an average particle size of 5 micron on square bars of metal titanium to form a thickness of 0.01 mm. Deposition was performed by providing the titanium dioxide powders to 10 L/min of argon and 1 L/min of hydrogen. As a result of the thermogravimetric analysis, Sample 2-3 was estimated to have x=1.965. When the nonconductive titanium oxide coating before the discharge was similarly estimated, the result was $TiO_x$ (x=2.000).

Figure 11:
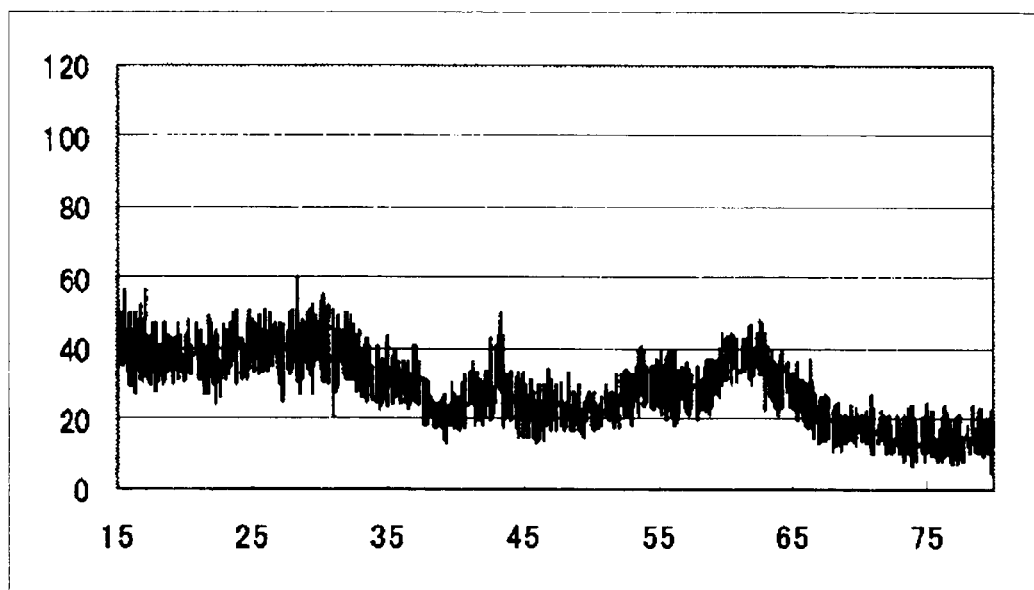
FIG. 11 is an X-ray diffraction spectrum of Sample 2-3.

The X-ray diffraction spectrum of Sample 2-3 is shown in FIG. 11 (the vertical axis is intensity, the horizontal axis is 2θ).

Figure 12:
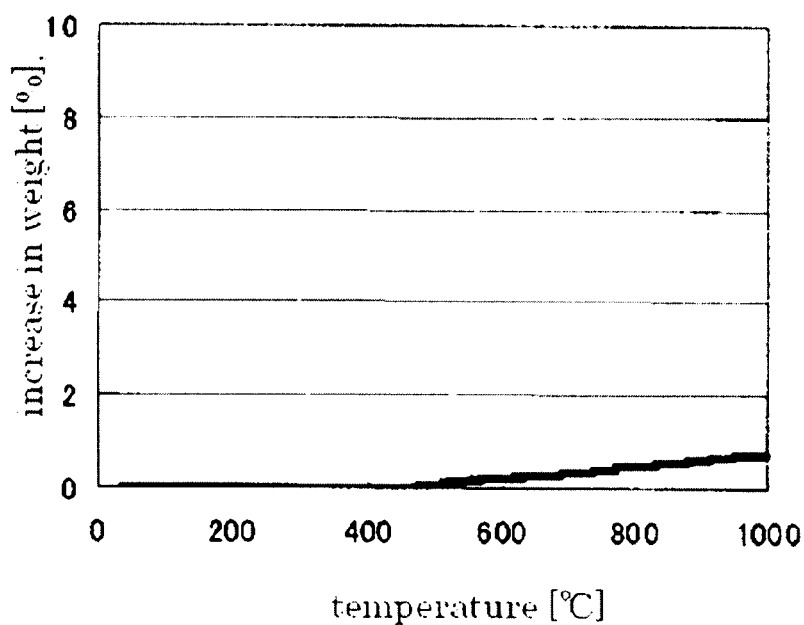
FIG. 12 is a thermogravimetric analysis diagram of Sample 2-3.

The thermogravimetric analysis diagram of Sample 2-3 is shown in FIG. 12.

Example 2-4

The procedure of Example 2-1 was performed except that the electrical discharge of Example 2-1 was changed to a direct current continuous discharge (200 V, 10 A), to obtain 2.7 g of particulates with a blue appearance (Sample 2-4). The average composition of Sample 2-4 was estimated to be $TiO_x$ (x=1.579).

Figure 13:
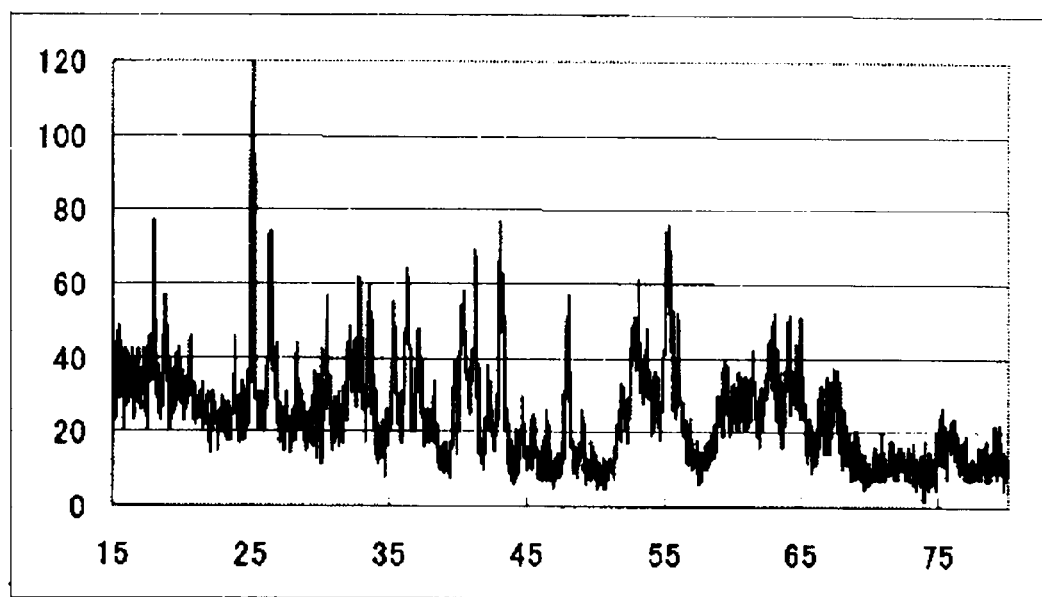
FIG. 13 is an X-ray diffraction spectrum of Sample 2-4.

The X-ray diffraction spectrum of Sample 2-4 is shown in FIG. 13 (the vertical axis is intensity, the horizontal axis is 2θ).

Figure 14:
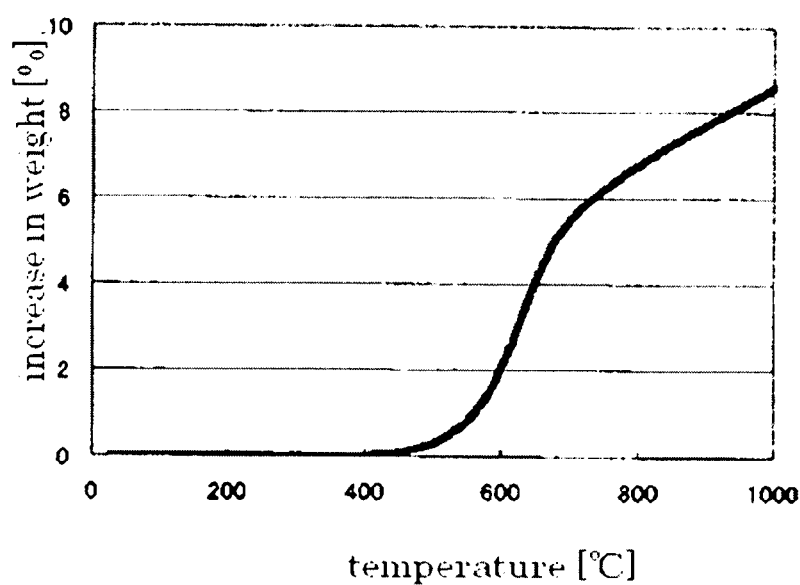
FIG. 14 is a thermogravimetric analysis diagram of Sample 2-4.

The thermogravimetric analysis diagram of Sample 2-4 is shown in FIG. 14.

Example 2-5

The procedure of Example 2-1 was performed except that the 200 ml of ion-exchanged water in Example 2-1 was changed to a mixed liquid consisting of 20 g of tetraethylene glycol (product of Wako Pure Chemical Industries, Special Grade) and 180 g of ion-exchanged water, to obtain 3.0 g of particulates with a black appearance (Sample 2-5). The average composition of Sample 2-5 was estimated to be $TiO_x$ (x=1.738) and a spectrum similar to that of Sample 2-1 resulted from an XRD analysis.

Example 2-6

The titanium oxide electrodes of Example 2-1 were replaced by electrodes that are 200 mm long, 5 mm wide, 2 mm thick and which comprise a conductive titanium oxide at a density of 3.9 g/cm³. These electrodes were obtained by sintering titanium dioxide powders (Company name: Sakai Chemical Industry Co., Product name: FTR700, primary particle size 200 nm) using Spark Plasma Sintering (SPS produced by SYNTEX Co., SPS-1050) at a temperature of 600° C. and a pressure of 25 MPa for 20 minutes. The procedure of Example 2-1 was performed except for using the above electrodes to obtain 3.4 g of particulates with a black appearance (Sample 2-6). The average composition of Sample 2-6 was estimated to be $TiO_x$ (x=1.737) and a spectrum similar to that of Sample 2-1 resulted from an XRD analysis.

The raman spectra of Samples 1-1 to 2-6 were measured (measured using NRS-3100 produced by JASCO Co.). Those spectra are shown in FIGS. 15 to 25 (the vertical axis is intensity, and the horizontal axis is $cm^{-1}$ in the drawings). Further, Table 1 shows the correspondence between Samples 1-1 to 2-6 and FIGS. 15 to 25.

TABLE 1

Figure 15:
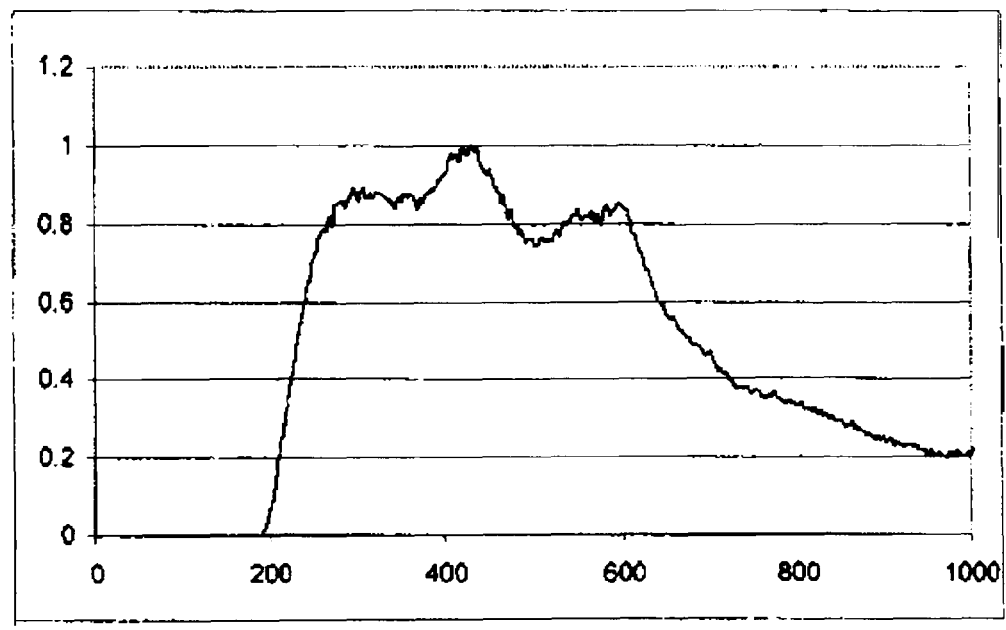
FIG. 15 is a raman spectrum of Sample 1-1.
Figure 16:
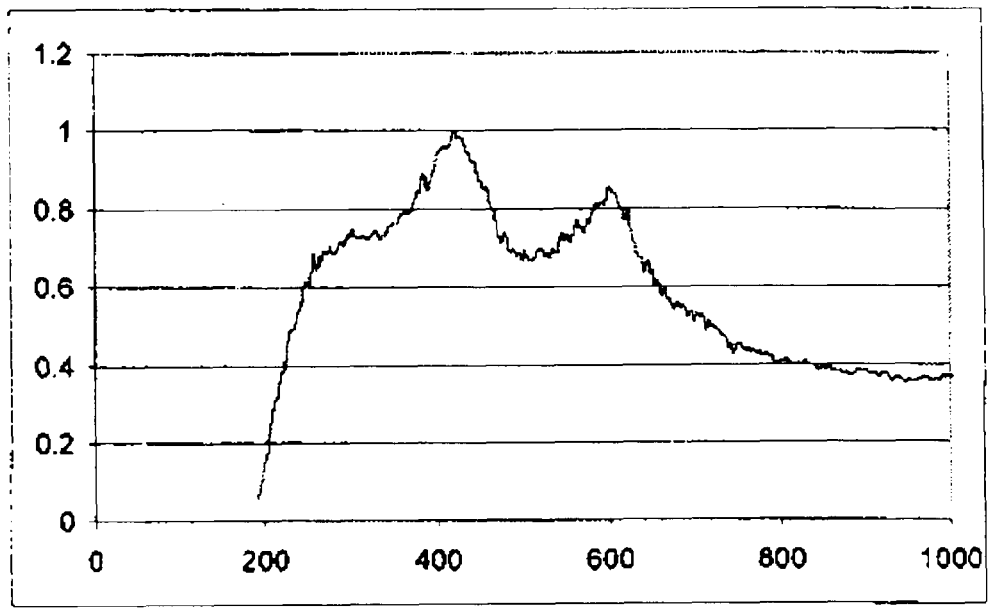
FIG. 16 is a raman spectrum of Sample 1-2.
Figure 17:
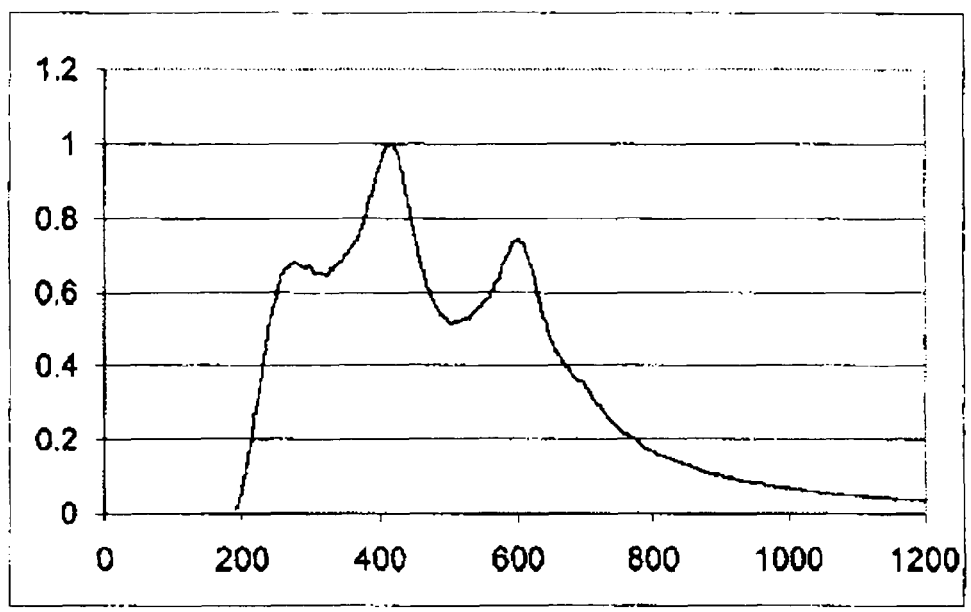
FIG. 17 is a raman spectrum of Sample 1-3.
Figure 18:
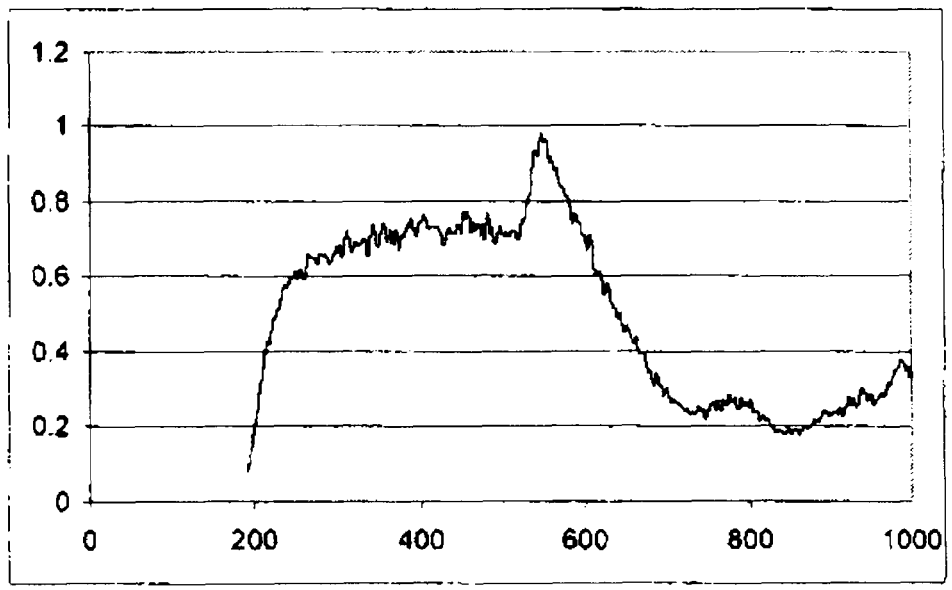
FIG. 18 is a raman spectrum of Sample 1-4.
Figure 19:
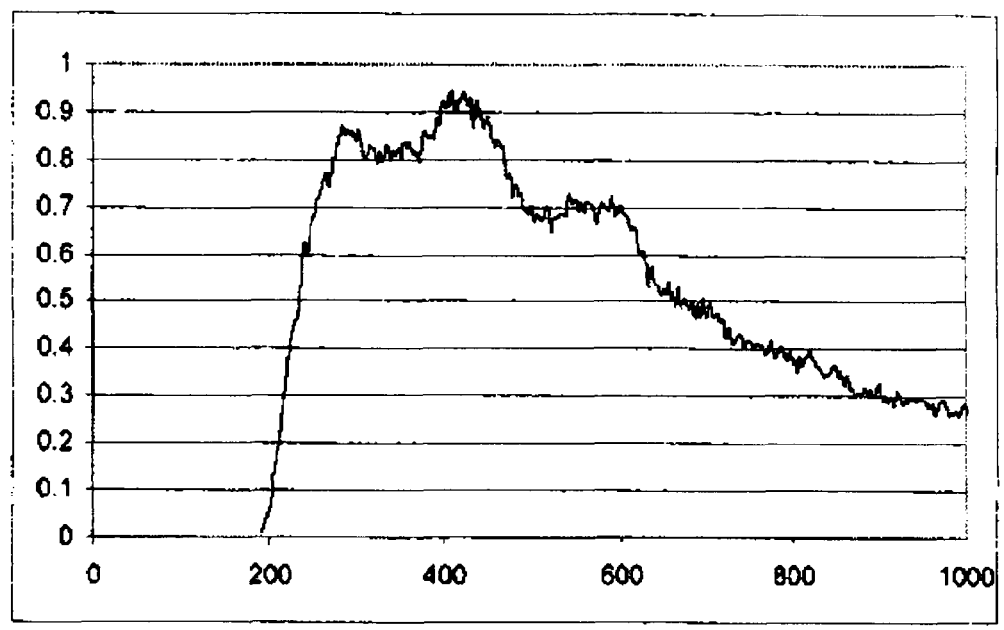
FIG. 19 is a raman spectrum of Sample 1-5.
Figure 20:
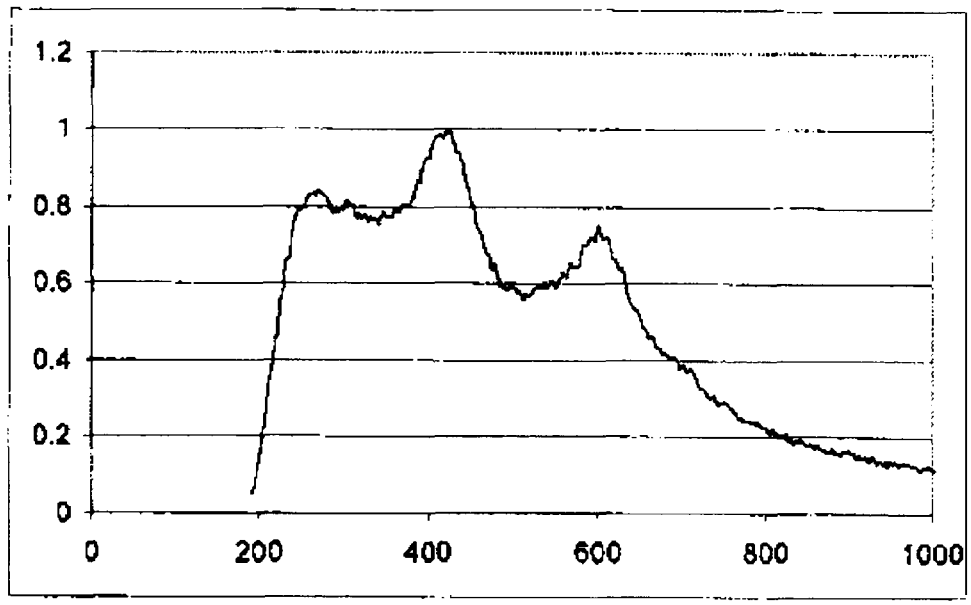
FIG. 20 is a raman spectrum of Sample 2-1.
Figure 21:
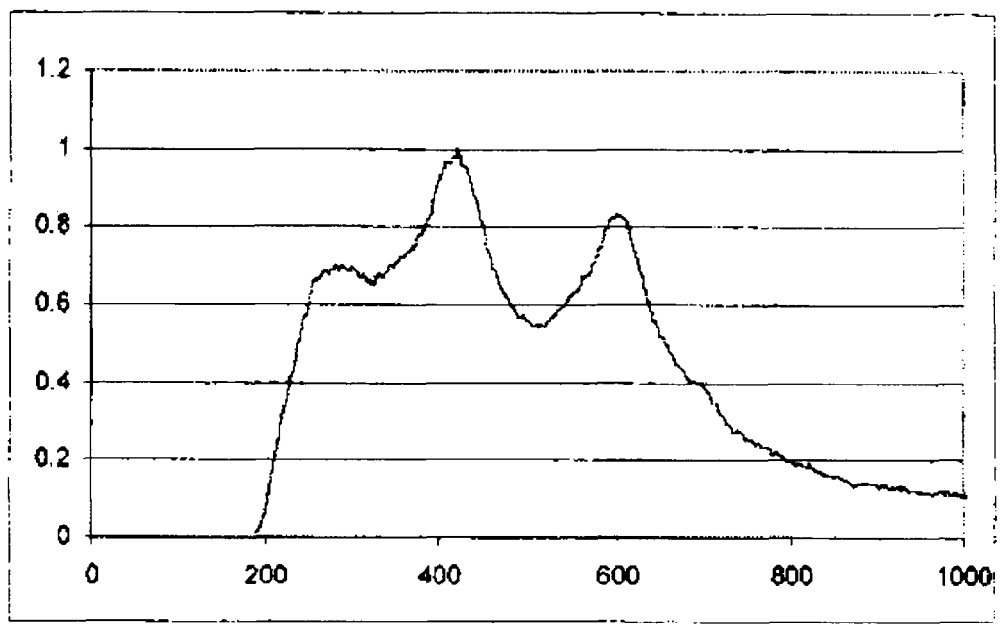
FIG. 21 is a raman spectrum of Sample 2-2.
Figure 22:
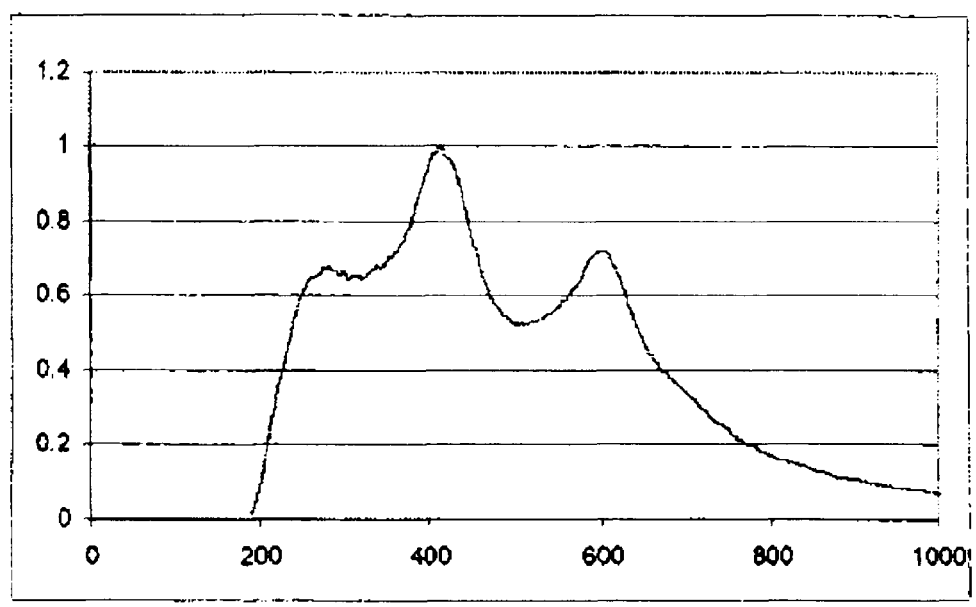
FIG. 22 is a raman spectrum of Sample 2-3.
Figure 23:
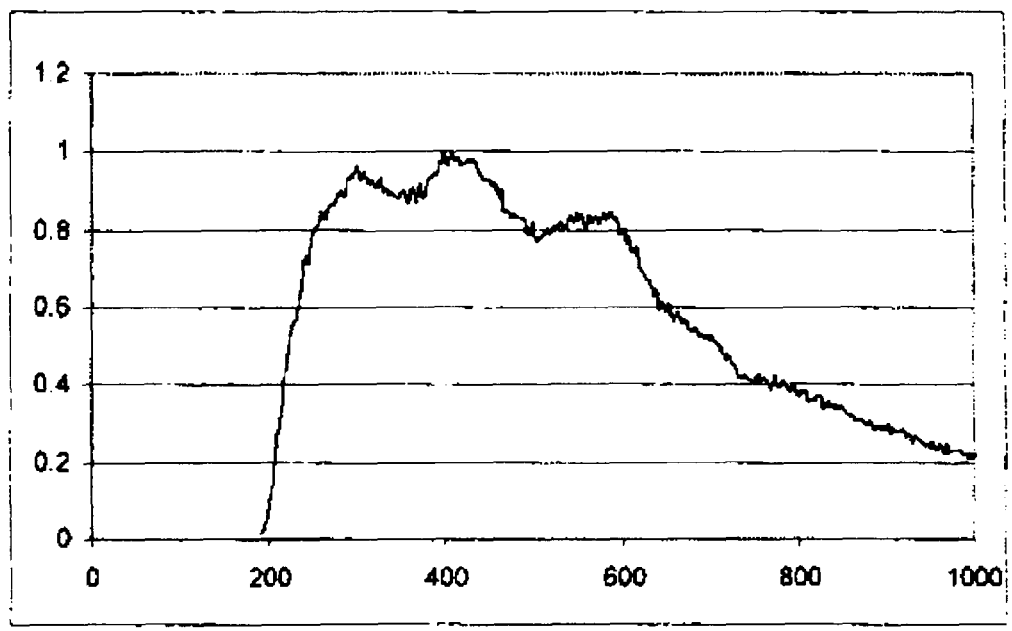
FIG. 23 is a raman spectrum of Sample 2-4.
Figure 24:
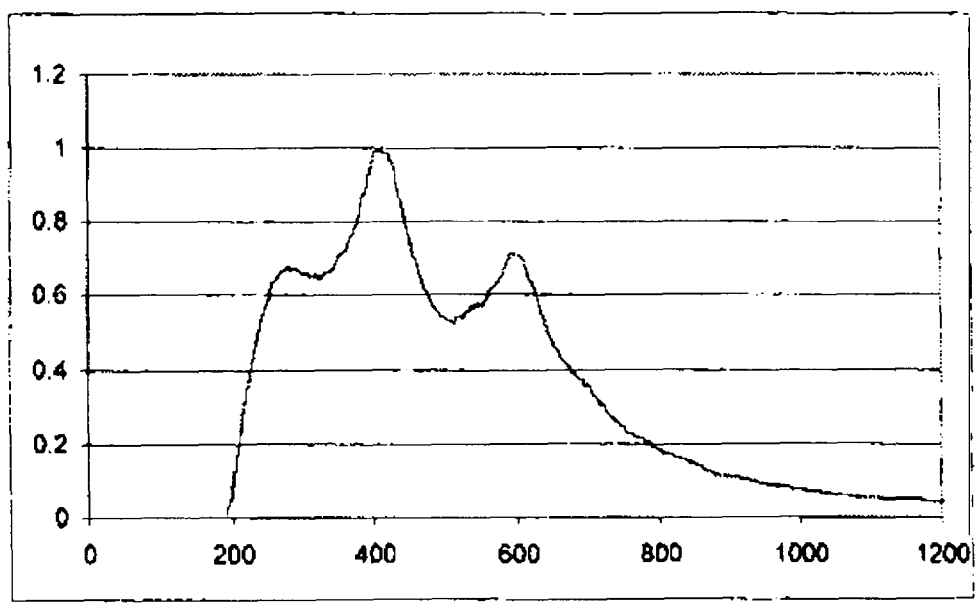
FIG. 24 is a raman spectrum of Sample 2-5.
Figure 25:
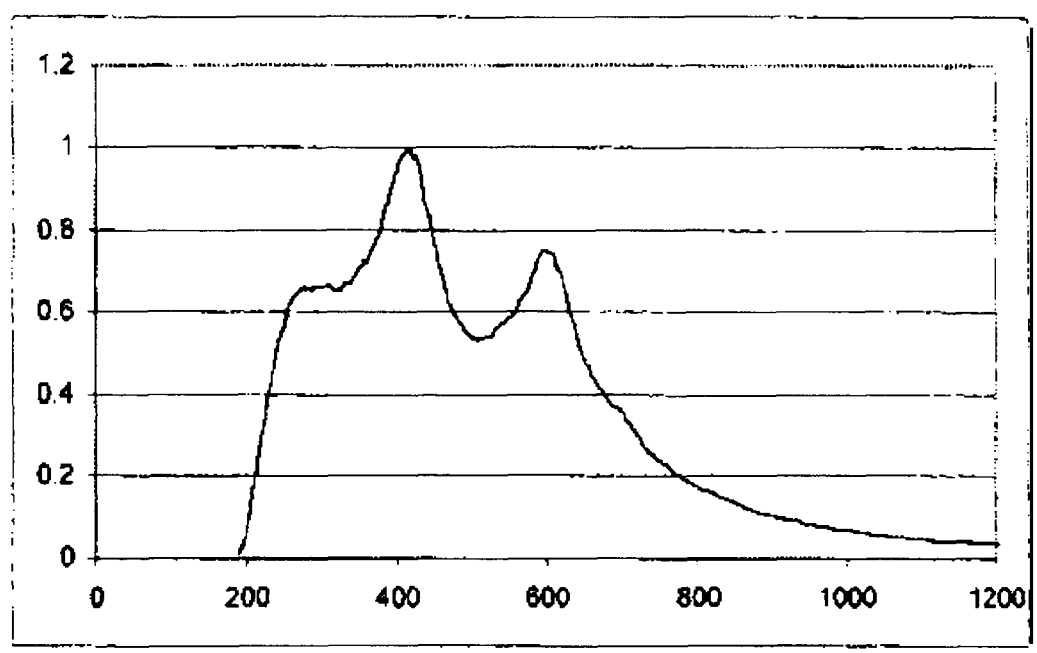
FIG. 25 is a raman spectrum of Sample 2-6.

| Name of Sample | Raman Spectrum |
|---|---|
| Sample 1-1 | FIG. 15 |
| Sample 1-2 | FIG. 16 |
| Sample 1-3 | FIG. 17 |
| Sample 1-4 | FIG. 18 |
| Sample 1-5 | FIG. 19 |
| Sample 2-1 | FIG. 20 |
| Sample 2-2 | FIG. 21 |
| Sample 2-3 | FIG. 22 |
| Sample 2-4 | FIG. 23 |
| Sample 2-5 | FIG. 24 |
| Sample 2-6 | FIG. 25 |

The above raman spectra demonstrate that the low valence titanium oxides obtained in the present invention show characteristic peaks.

INDUSTRIAL APPLICABILITY

According to the method of the present invention, low valence titanium oxides having desired compositions can be produced in a steady supply manner acceptable in industrial production, and thus the present invention has great industrial usability.

Further, the low valence titanium oxides obtained in the present invention have excellent electrical conductivity and advances are expected in its usage as various electronic devices and photocatalysts. Specifically, expectations exist for its use as an electrode material of secondary cells.

The invention claimed is:

1. A method of producing at least one low valence titanium oxide of formula (I):

$$TiO_x \quad (I)$$

wherein 1.5<x<2.0,
the method comprising:
electrically discharging between two electrodes in an aqueous medium to prepare the at least one low valence titanium oxide, wherein at least one of the electrodes is a conductive titanium oxide-comprising electrode.

2. A method of producing at least one low valence titanium oxide of formula (I):

$$TiO_x \quad (I)$$

wherein 1.5<x<2.0,
the method comprising:
electrically discharging between a conductive titanium oxide-comprising electrode and a metal titanium electrode in an aqueous medium to prepare the at least one low valence titanium oxide.

3. A method of producing at least one low valence titanium oxide of formula (I):

$$TiO_x \qquad (I)$$

wherein $1.5<x<2.0$, the method comprising:

electrically discharging between two conductive titanium oxide-comprising electrodes in an aqueous medium to prepare the at least one low valence titanium oxide.

4. The method of claim 1, wherein the electrically discharging comprises direct-current continuous discharge or direct-current pulsed discharge.

5. The method of claim 2, wherein the electrically discharging comprises direct-current continuous discharge or pulsed discharge.

6. The method of claim 1, wherein the other electrode comprises a metal titanium or at least one non-conductive titanium oxide.

7. The method of claim 3, wherein the electrically discharging comprises direct-current continuous discharge or pulsed discharge.

8. The method of claim 1, wherein the aqueous medium comprises water at a ratio of 50 wt % or higher, based on the medium.

9. The method of claim 8, wherein the aqueous medium comprises a mixture of water and a water soluble organic solvent.

10. The method of claim 9, wherein the water soluble organic solvent is at least one selected from the group consisting of alkylene glycol, methyl ether and ethyl ether.

11. The method of claim 1, wherein the electrical discharging comprises applying an electric current between the two electrodes, wherein the electric current is a direct current.

12. The method of claim 1, wherein the electrical discharging comprises applying an electric current between the two electrodes, wherein the electric current is an alternating current.

13. The method of claim 12, wherein the alternating current is rectified with a diode.

14. The method of claim 1, wherein a discharge voltage is from 20 to 500 V.

15. The method of claim 1, wherein a discharge voltage is from 60 to 400 V.

16. The method of claim 1, wherein a discharge voltage is from 80 to 300 V.

17. The method of claim 1, wherein a discharge current is from 1 to 200 A.

18. The method of claim 1, wherein a discharge current is from 2 to 150 A.

19. The method of claim 1, wherein a discharge current is from 5 to 120 A.

* * * * *